3,067,246
METHOD OF PRODUCING MELLITIC ACID
Bernhard Jüttner, Manteuffelstrasse 28, Essen, Germany
No Drawing. Filed Jan. 12, 1961, Ser. No. 82,181
Claims priority, application Germany Jan. 13, 1960
6 Claims. (Cl. 260—515)

The present invention relates to the production of mellitic acid and more particularly to the conversion of tetrachlorophthalic acid or tetrachloroterephthalic acid to mellitic acid.

It is known that tetrachlorophthalic acid or tetrachloroterephthalic can be converted to mellitic acid by reaction with potassium cyanide and copper cyanide in aqueous alkaline solution achieved by heating in an autoclave at a temperature of 180–200° C. (Note F. Feist, Ber. 1935, 68th year, page 1942). By carrying out this reaction under the conditions set forth by Feist yields of up to 60% can be achieved, however, this yield is only of the crude ash-containing product; the yield of pure mellitic acid amounts only to 37%.

It is accordingly a primary object of the present invention to provide a method of improving the above set forth Feist process whereby much higher yields of pure mellitic acid are achieved.

It is another object of the present invention to provide a method of converting tetrachlorophthalic acid or tetrachloroterephthalic acid to mellitic acid in high yield by heating with an alkali metal cyanide and copper cyanide, by carrying out such reaction in the presence of compounds which have been found to be catalysts for this reaction.

Other objects and advantages of the present invention will be apparent from further reading of the specification and of the appended claims.

With the above and other objects in view, the present invention mainly comprises the production of mellitic acid by heating a substance selected from the group consisting of tetrachlorophthalic acid, tetrachloroterephthalic acid and anhydrides thereof with an alkali metal cyanide and copper cyanide in the presence of an aqueous alkaline solution and in the presence of at least one metal compound selected from the group consisting of chromium, copper and iron oxides, hydrides and mineral acid salts, and cyano complex salts of divalent copper, divalent iron and trivalent iron so as to convert the substance to mellitic acid in high yield.

The metal compound in an amount of as little as 20% by weight of the starting material will greatly improve the yield of mellitic acid. The amount of the metal compound may be increased to 80% by weight or even higher. There is actually no limit, except practical, as to the amount of the metal compound, but since amounts greater than 80% by weight do not further improve the results of the reaction, such amounts are of course unnecessary.

In order to improve the course of the reaction, it is desirable to thoroughly mix the metal compound with the solid starting material, e.g., the tetrachlorophthalic acid, prior to carrying out the reaction.

When the catalyst which is used is a chromium copper or iron oxide, hydroxide or mineral acid salt, the amount thereof is preferably 20–60% by weight of the starting material, and most preferably 30–60% by weight.

When the catalyst used is a cyano complex salt of divalent copper, divalent iron or trivalent iron, the amount thereof is preferably about 30–80% by weight of the starting material and most preferably about 50–70% by weight.

In accordance with a preferred embodiment of the present invention, the catalyst which is used consists of a cyano complex salt of divalent copper, divalent iron or trivalent iron in an amount of about 30–80% by weight and most preferably 50–70% by weight, plus a small amount of chromium, copper or iron oxide, hydroxide or mineral acid salt, preferably in an amount of about 0.5–5% by weight of the starting acid, and most preferably about 1–4% by weight. It has been found that such mixture gives the highest yields.

Among the cyano complex salts of divalent copper, divalent iron and trivalent iron, the most preferred is the compound known as Berlin blue. This compound may also be commercially purchased as Paris blue, Prussian blue, Chinese blue and mineral blue. The compound is known as ferric ferrocyanide having a formula

$[Fe_4Fe(CN)_6]_3$

The commercially available compound usually contains some alkali ferrocyanide, such as potassium ferrocyanide, so that in such case the compound may be considered as having the following formula

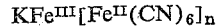
$KFe^{III}[Fe^{II}(CN)_6]_n$

The most preferred metal compound of the group of chromium, copper and iron oxides, hydroxides and mineral acid salts is ferric oxide $Fe_2O_3$. However, other oxides and hydroxides such as $CuO$, $Cu(OH)_2$, $Cr_2O_3$, $FeO(OH)$ and $Fe(OH)_2$ may also be used with very good results. Mineral acid salts of chromium, copper or iron such as sulfates, chlorides and nitrates thereof may also be used with very good results.

The amount of copper cyanide used in the reaction is preferably 50–100 parts by weight, and most preferably 60–90 parts by weight for each 100 parts by weight of the tetrachlorophthalic acid, tetrachloroterephthalic acid or anhydrides thereof. Larger amounts of copper cyanide may be used but do not increase the yield and are therefore unnecessary.

Of the alkali metal cyanides the most suitable for the purpose of the method of the present invention is potassium cyanide. However, sodium cyanide as well as the double salt of sodium and potassium cyanide also gives excellent results. For each 100 parts by weight of starting material the amount of alkali metal cyanide is preferably about 150–300 parts by weight and most preferably about 200 parts by weight.

For each 100 parts by weight of starting material the amount of solid alkali in the aqueous alkaline solution is preferably about 25–80 parts by weight and most preferably about 50 parts by weight. The amount of water is preferably about 2 to 4 times the amount of starting material and most preferably about 3 times.

The reaction, depending upon the activity of the catalyst and the amount of catalyst used, is completed in about 4–15 hours. With normal activity of the catalyst the reaction time requires about 8–14 hours for completion.

The reaction temperature is preferably maintained at 160–260° C., with higher reaction temperatures shortening the reaction time, and most preferably at 170–190° C., in order to achieve optimum results.

The reaction is preferably carried out in a closed autoclave so that the reaction is carried out under pressure, a pressure of about 25–100 atmospheres being preferred and a constant pressure of about 30 atmospheres being most preferred. The pressure is increased in the autoclave by the freed ammonia, and the pressure may be maintained at a chosen constant level by means of a valve.

It has further been found in accordance with the present invention that the insoluble portion of reactants of the reaction mixture can be used as a fully active catalyst for further reaction, so that the catalyst can be recycled and reused in the process. This recycling procedure can be carried out most economically by reacting the hydrogen cyanide which is formed by conversion of the first-formed alkali metal salt of the mellitic acid into the free acid over this insoluble portion. For this purpose the insoluble portion is first separated from the alkaline reaction mixture and reacted anew with aqueous alkali. The hydrogen cyanide is then introduced into this suspension, whereby cyanide forms under warming. By recovering the hydrogen cyanide in the form of cyanides in this manner a catalyst starting material may be used for at least 5 additional reactions.

The working up of the reaction solution separated from the insoluble portion proceeds by acidification (with the development of hydrogen cyanide) and further working up proceeds according to the usual methods of organic chemistry, for example extraction or steaming and sublimation. Also by proceeding herein a residue precipitates which contains a portion of the original catalyst and therefore it is preferable before or after the recovery of the hydrogen cyanide united with the insoluble residue from the reaction mixture.

The following examples are given to further illustrate the present invention. The scope of the invention is not, however, meant to be limited to the specific details of the examples.

*Example I*

30 parts by weight of tetrachlorophthalic acid anhydride, 50 parts by weight of KCN, 15 parts by weight of CuCN, 20 parts by weight of Paris blue R 931 i.e. commercial ferric ferrocyanide, and 2 parts by weight of $Fe_2O_3$ are thoroughly mixed one with the other and introduced into an iron autoclave. There is added thereto 100 parts by weight of water with 15 parts by weight of KOH. The autoclave is then heated for 7 hours at 170° C. resulting in a pressure increase of 37 atmospheres. After cooling the reddish colored reaction mixture in the autoclave is heated to boiling for 1 hour with double the weight of 50% sulfuric acid and under vigorous passage through of air (to drive off the hydrogen cyanide).

The insoluble residue is filtered off and the filtrate is extracted with butanone. The extract which contains the free mellitic acid is freed of the butanone by distillation after addition of water, and the aqueous mellitic acid is concentrated. Thereafter 4 times the weight amount of nitric acid (D=1.5) is added and after cooling the precipitated mellitic acid is filtered off. The yield is 35 parts by weight which is equal to 87% of the theoretical. The acid number is 980 and the ash content is 0.05.

The insoluble residue separated prior to the butanone extraction consists mainly of copper oxides and by the use of the freed hydrogen cyanide is again worked up to copper cyanide.

*Example II*

A mixture of 30 parts by weight of tetrachloroterephthalic acid, 80 parts by weight of sodium cyanide, 20 parts by weight of CuCN, 10 parts by weight of $Fe_2O_3$, 20 parts by weight of NaOH and 90 parts by weight of water are heated in an iron autoclave for 8 hours at 180° C. This results in a pressure increase to 40 atmospheres.

After cooling the contents of the autoclave are further worked up as in Example I. The precipitated mellitic acid has an acid number of 978. The yield amounts to 90% of the theoretical.

*Example III*

A mixture of 200 parts by weight of tetrachloroterephthalic acid anhydride, 520 parts by weight of double salt of potassium-sodium cyanide, 216 parts by weight of CuCN, 160 parts by weight of chemically pure Berlin blue i.e. ferric ferrocyanide, 8 parts by weight of $Fe_2O_3$, 120 parts by weight of KOH and 800 parts by weight of water are heated for 14 hours in an iron autoclave at 170° C. The pressure increases to 86 atmospheres.

The working up of the contents of the autoclave proceeds as in Example I. The obtained mellitic acid has an acid number of 979 and an ash content of 0.99. The yield amounts to 262 parts by weight which is equivalent to 87% of the theoretical.

*Example IV*

250 parts by weight of tetrachlorophthalic acid anhydride, 520 parts by weight of KCN, 216 parts by weight of CuCN, 160 parts by weight of Berlin blue i.e. ferric ferrocyanide, 8 parts by weightt of $Fe_2O_3$, 120 parts by weight of KOH and 800 parts by weight of water are heated for 14 hours in an iron autoclave at a temperature of 170° C. The pressure increases to 86 atmospheres.

After the end of the reaction the pressure is released and the contents of the autoclave are filtered off the insoluble residue. The still wet residue is stirred with 600 parts by weight of water. There is then added thereto 300 parts by weight of KOH and an additional 400 parts by weight of potassium cyanide (designated as residue).

The filtrate separated from the residue is introduced into a container provided with a reflux cooler as well as an inlet for air (or nitrogen) and an outlet for the hydrogen cyanide, which is connected to the residue. There is then added to the filtrate while passing air therethrough a total of 650 parts by weight of concentrated sulfuric acid, while simultaneously heating to boiling. The freed hydrogen cyanide is passed through the residue, whereby under warming the copper and the iron are converted to cyano complex salts. This reaction mixture is again mixed with 250 parts by weight of tetrachlorophthalic acid which is worked up to mellitic acid.

After completion of the hydrogen cyanide development the filtrate is extracted with butanone and the extract worked up as in Example I to mellitic acid. The yield of 262 parts by weight amounts to 87% of the theoretical.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of producing mellitic acid, which comprises heating a substance selected from the group consisting of tetrachlorophthalic acid, tetrachloroterephthalic acid and anhydrides thereof with an alkali metal cyanide and copper cyanide in the presence of an aqueous alkaline solution and in the presence of at least one metal compound selected from the group consisting of chromium, copper and iron oxides, hydroxides and mineral acid salts, and cyano complex salts of divalent copper, divalent iron and trivalent iron at a temperature of 160–260° C. under super-atmospheric pressure so as to convert said substance to mellitic acid.

2. The method of producing mellitic acid, which comprises heating a substance selected from the group consisting of tetrachlorophthalic acid, tetrachloroterephthalic acid and anhydrides thereof with an alkali metal cyanide and copper cyanide in the presence of an aqueous alkaline solution and in the presence of at least one metal compound selected from the group consisting of chromium, copper and iron oxides, hydroxides and mineral acid salts, and cyano complex salts of divalent copper, divalent iron and trivalent iron at a temperature of 160–260° C. under pressure of about 25–100 atmospheres so as to convert said substance to mellitic acid.

3. The method of producing mellitic acid, which comprises heating a substance selected from the group consisting of tetrachlorophthalic acid, tetrachloroterephthalic acid an anhydrides thereof with an alkali metal cyanide and copper cyanide in the presence of an aqueous alkaline solution and in the presence of at least 20% by weight of said substance of at least one metal compound selected from the group consisting of chromium, copper and iron oxides, hydroxides and mineral acid salts, and cyano complex salts of divalent copper, divalent iron and trivalent iron at a temperature of 160–260° C. under pressure of about 25–100 atmospheres so as to convert said substance to mellitic acid.

4. The method of producing mellitic acid, which comprises heating a substance selected from the group consisting of tetrachlorophthalic acid, tetrachloroterephthalic acid and anhydrides thereof with 150–300% by weight of said substance of an alkali metal cyanide and 50–100% by weight of said substance of copper cyanide in the presence of an aqueous alkaline solution and in the presence of at least 20% by weight of said substance of at least one metal compound selected from the group consisting of chromium, copper and iron oxides, hydroxides and mineral acid salts, and cyano complex salts of divalent copper, divalent iron and trivalent iron at a temperature of 160–260° C. under pressure of about 25–100 atmospheres so as to convert said substance to mellitic acid.

5. The method of producing mellitic acid, which comprises heating a substance selected from the group consisting of tetrachlorophthalic acid, tetrachloroterephthalic acid and anhydrides thereof with 150–300% by weight of said substance of an alkali metal cyanide and 50–100% by weight of said substance of copper cyanide in the presence of an aqueous alkaline solution containing 25–80% by weight of said substance of alkali and water in an amount of 2–4 times the amount of said substance and in the presence of at least 20% by weight of said substance of at least one metal compound selected from the group consisting of chromium, copper and iron oxides, hydroxides and mineral acid salts, and cyano complex salts of divalent copper, divalent iron and trivalent iron at a temperature of 160–260° C. under pressure of about 25–100 atmospheres so as to convert said substance to mellitic acid.

6. The method of producing mellitic acid, which comprises heating a substance selected from the group consisting of tetrachlorophthalic acid, tetrachloroterephthalic acid and anhydrides thereof with an alkali metal cyanide and copper cyanide in the presence of an aqueous alkaline solution and in the presence of about 30–80% by weight of said substance of a complex salt selected from the group consisting of cyano complex salts of divalent copper, divalent iron and trivalent iron and in the further presence of about 0.5–5% by weight of said substance of a metal compound selected from the group consisting of chromium, copper and iron oxides, hydroxides and mineral acid salts at a temperature of 160–260° C. under pressure of about 250–100 atmospheres so as to convert said substance to mellitic acid.

References Cited in the file of this patent

Feist: "Ber. Deut. Chem.," volume 68B (1935), pages 1941–3.

Brusset et al.: "Bull. Soc. Chim. France" (1951), pages 565–7.